Feb. 24, 1942.   H. F. CRAMER   2,274,190
ELECTRICAL MEAT COOKER
Filed Oct. 21, 1940   2 Sheets-Sheet 1
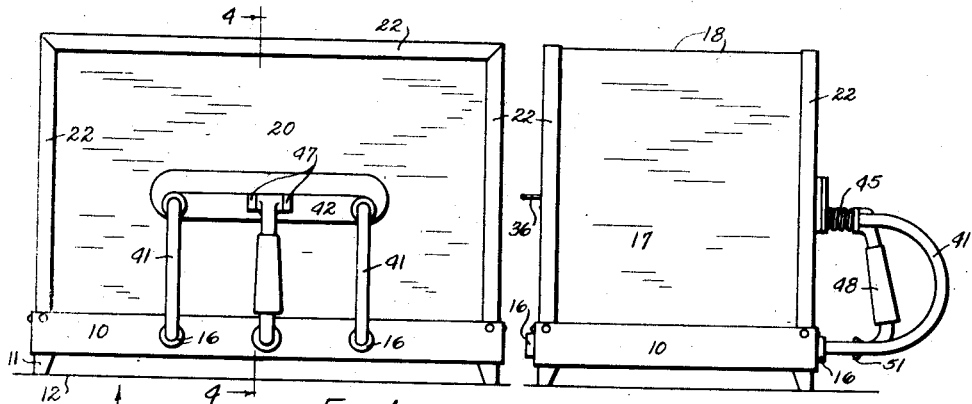
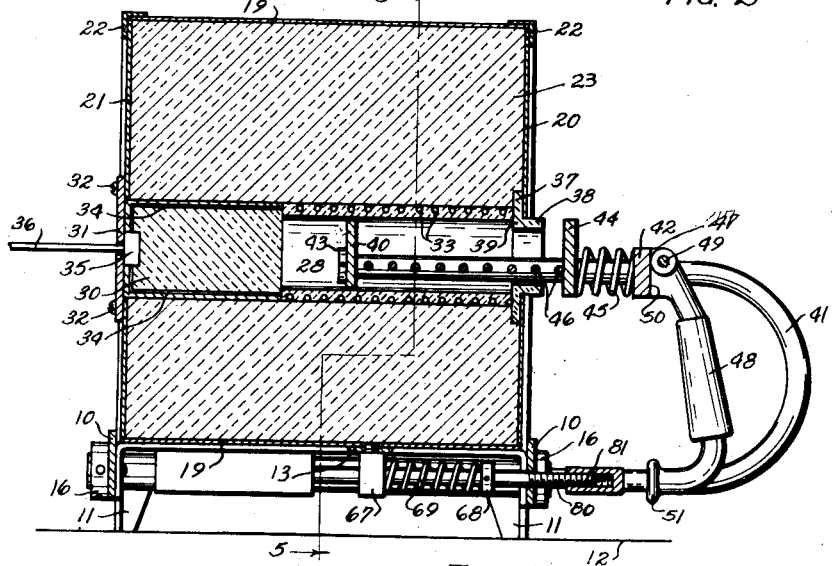
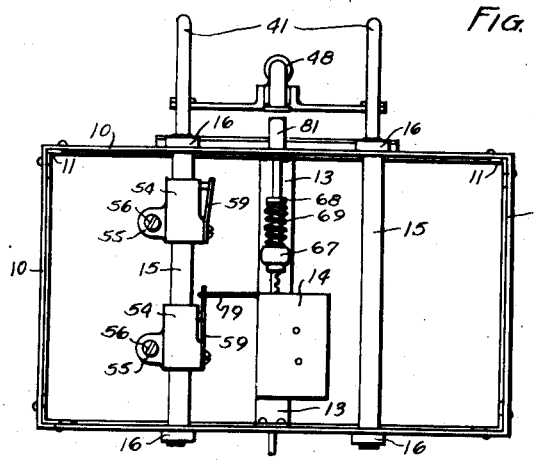
Inventor:
Harold F. Cramer
By Martin E. Anderson
Attorney Feb. 24, 1942.  H. F. CRAMER  2,274,190
ELECTRICAL MEAT COOKER
Filed Oct. 21, 1940  2 Sheets-Sheet 2

Inventor:
Harold F. Cramer
By Martin E. Anderson
Attorney

Patented Feb. 24, 1942

2,274,190

UNITED STATES PATENT OFFICE 2,274,190

ELECTRICAL MEAT COOKER

Harold F. Cramer, Denver, Colo.

Application October 21, 1940, Serial No. 362,075

7 Claims. (Cl. 219—35)

This invention relates to improvements in electrical meat cookers and has reference more particularly to a high temperature cooking apparatus designed with special reference to the needs of lunch rooms and places where steak and meat sandwiches are prepared.

It has been found by experiment that it is possible to thoroughly cook a steak of ordinary thickness in the short time of between twenty and thirty seconds by exposing the steak simultaneously on all sides to a temperature of between 1700 and 2000 degrees Fahrenheit. By subjecting steaks or other meats suddenly and over their entire surfaces to such high temperature the outer surface becomes seared and sealed so as to retain the juices and the action of this high temperature on the cells and fibrils of the meat have the unexpected result of tenderizing even the tougher cuts and to produce a tender and juicy steak from cuts that would otherwise be unsatisfactory.

It is the object of this invention to produce an apparatus of moderate size that shall be provided with an electrically heated muffle whose temperature can be raised to and maintained at at least 1700 degrees Fahrenheit, and which shall also be provided with a grid mounted for reciprocation into and out of the muffle and which is held in the muffle by means of a detent which is released by a time responsive mechanism which can be set so as to release the grid at the expiration of a predetermined number of seconds and which therefore renders the timing automatic and prevents over cooking which might readily occur if the grid were to be operated manually.

Another object of this invention is to produce a high temperature cooker in which a hollow muffle of refractory material is positioned in a housing and surrounded by heat insulating material and in which the muffle can be readily removed for repair and inspection.

Another object is to produce an automatic electrical meat cooker in which the entrance to the muffle is automatically closed by the movement of the grid into and out of the operative position so as to conserve the heat when the grid is outside of the muffle and to retain the heat during the cooking operation.

The above and any other objects that may become apparent as this description proceeds are attained by means of a construction and an arrangement of parts that will now be described in detail and for this purpose reference will be had to the accompanying drawings in which the invention has been illustrated in its preferred form, and in which:

Figure 1 is a front elevation of the apparatus forming the subject of this invention;

Figure 2 is a side elevation thereof;

Figure 3 is a bottom plan view looking in the direction of arrow 3, in Figure 1;

Figure 4 is a section on a somewhat enlarged scale, taken on line 4—4, Figure 1;

Figure 5:
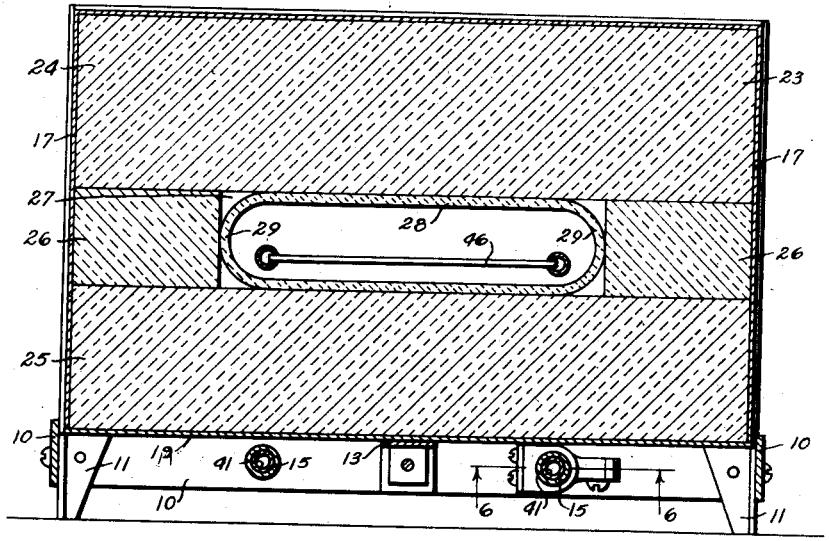
Figure 5 is a section taken on line 5—5, Figure 4.

Referring now to the drawings, reference numeral 10 designates a frame which forms the base of the apparatus. This frame is rectangular as shown in Figure 3 and is formed from a flat metal bar. Positioned at each corner of the frame are short angle iron supports 11 that serve to hold the frame above the supporting surface which has been designated by reference numeral 12. Extending across the frame at its center is a flat bar 13 that serves as a support for the time responsive mechanism which has been indicated by reference numeral 14 in Figure 3. Tubular guides 15 connect the side member of the frame and extend entirely through the latter. These guides are held in position by means of collars 16. Supported on the frame is a housing constructed from sheet metal and provided with ends 17, a top 18, a bottom 19, a front side 20 and a rear side 21. Chromium plated angle irons 22 have been shown as extending around the corner edges of the housing so as to give the latter a finished appearance. The housing is of such size and shape that it will fit in the frame 10 in the manner shown in Figures 4 and 5 and can be readily removed from the frame whenever desired. The housing is provided with a lining of refractory heat insulating material which has been designated by reference numeral 23. This material may be of any suitable kind as there are many high grade heat insulating materials on the market. The lining is preferably formed by blocks and in the embodiment illustrated there are two blocks 24 and 25 which are held in spaced relation by smaller blocks 26 in such a way as to form a rectangular opening which has been designated by reference numeral 27. Positioned within this opening is a muffle constructed from a high grade refractory material such as "sillimanite" but any other high grade refractory material may be substituted if desired. The muffle has been designated by reference numeral 28 and in the present embodiment has been shown as provided with rounded ends 29. The muffle is shorter than the distance between the sides 20 and 21 and a block of heat insulating material 30 extends from the inner end of the muffle to the plate 31 which closes an opening in the side wall 21 and which is secured to the latter by means of screws 32. The outer surface of the muffle is provided with a helical groove 33 in which is wound a high resistance heating element which, for the purpose of this disclosure may be "nichrome," but any other resistance material having the necessary physical characteristics may be substituted. Conductors 34 connect the ends of the resistance element with a junction box or plug outlet 35 where they are connected with the ends of an extension cord 36 which may be connected to a suitable source of electrical energy. The side 20 is provided with an opening somewhat smaller than opening 27 and positioned in this opening is a bushing 37 which is made from high grade refractory material such as "sillimanite." The bushing has a flange 38 that extends outwardly beyond the side 20 and serves to deflect any heat which escapes from the muffle in a direction to prevent it from coming in contact with the side 20 and spoiling its finish. The opening in the bushing 37 is somewhat smaller than the opening in the muffle so as to provide a shoulder 39 that is engaged by a plate 40 which is carried by the grid and which serves to retard the escape of heat in a manner to be hereinafter explained.

The meat or other material to be cooked is supported on a grid which will now be described. The grid is formed from two U-shaped tubular members or bars which have been designated by reference numerals 41. These U-shaped members are identical in shape and size, differing from each other in minor particulars to which reference will be hereinafter made. One of the straight sides of each member 41 is slidably mounted in a guide 15 and the other straight side extends through the opening in the collar 37 and into the muffle in the manner shown in Figure 4. A metal bar 42 connects the two straight sides of the supporting bars and is preferably joined to the latter by welding. The inner ends of the parts of bars 41 that project into the muffle are connected by a refractory plate 40 which is preferably made from "sillimanite" or some equally high grade refractory material. This plate is held in place by means of collars 43. A plate 44 which is also made from a high grade refractory material is slidably mounted on the supporting bars and is acted upon by springs 45 which tends to urge it inwardly. Extending between the two straight sides of bars 41 are rods 46 which serve as a support for the meat or other material to be cooked. These rods have their ends extending into openings in the supporting bars and are loosely connected with the latter in such a way that they can move longitudinally but are of sufficient length to prevent them from falling out. By supporting the rods 46 loosely in the manner indicated, no strains are set up when the temperature of the grid changes as would be the case if these rods were welded or otherwise rigidly secured to the supporting bars. The connecting bar 42 is provided with two spaced ears 47 between which is pivotally mounted a handle 48. A pivot pin 49 extends through the ears 47 and the upper end of the handle so that the latter may turn about this pivot. The upper end of the handle is provided with a stop surface 50 which engages the bar 42 and limits clockwise movement to the position shown in Figure 4. The lower end of the handle is curved inwardly and terminates in an enlarged head 51, the purpose of which will appear as the description proceeds. The ends of bars 41 which are slidably mounted in the guides 15 engage one end of a helical compression spring 52 whose other end is held in abutting relation to the pin 53. When the bars 41 are moved inwardly, the helical spring or springs 52 are compressed. In the present embodiment only one spring is employed in connection with one of the bars 41 but each bar may be engaged by a separate spring, if desired.

Figure 6:
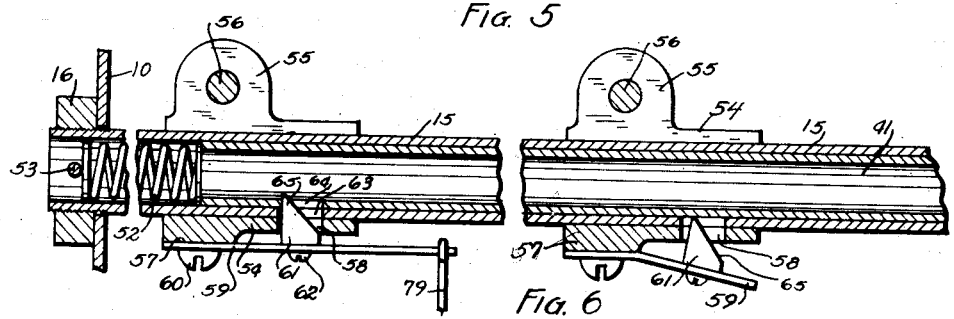
Figure 6 is a section taken on line 6—6, Figure 5, and shows a detail of the construction.
Figure 7:
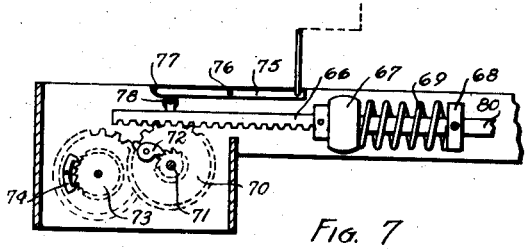
Figure 7 is a view showing in a diagrammatic manner a time responsive mechanism for controlling the detent.

Referring now more particularly to Figures 3, 6 and 7, it will be observed that one of the guides 15 is provided with two detents each of which consists of a tubular casting 54 which is split along one side where lugs 55 are provided. These lugs are perforated for the reception of clamping screws 56 which secure them in position on the guide. Each casting is provided with a raised portion 57 and an opening 58. A spring 59 is secured to the raised portion by means of a screw 60. A pawl or lug 61 is secured to the spring 59 by any suitable means, such as a screw 62 and this pawl projects inwardly and extends through an opening 63 provided in the guide 15. The straight side of member 41 which is slidable in this guide is also provided with an opening which has been designated by reference numeral 64. When the U-shaped members 41 are moved inwardly so as to compress the spring 52, the opening 64 will be brought into register with the opening 63 and the pawl 61 will move into the opening 64 and hold the member 41 from moving outwardly in response to the action of spring 52. By flexing the spring 59 downwardly from the position shown in Figure 6, the pawl can be withdrawn from opening 64 whereupon the spring will function to move the member 41 outwardly. In order to limit the outward movement of the grid assembly comprising the U-shaped members 41, a second detent has been provided as shown in Figure 6. When the opening 64 arrives at a position opposite the opening 58, the pawl 61 will enter opening 64 and limit further outward movement. The stop or detent shown to the right in Figure 6 is identical to the one shown to the left with the exception that the spring 59 may be made somewhat shorter, if desired. It will be observed that the lugs 61 are provided with inclined surfaces 65 so that they will serve as stops only when the members 41 move outwardly, but will be moved into inoperative position when the grid assembly is moved inwardly.

For the purpose of releasing the grid assembly at the end of the predetermined period of time, a time responsive mechanism has been provided. This mechanism has been indicated in a general way by reference numeral 14 in Figure 3 and comprises a mechanism now in general use for similar purposes in other apparatus and will therefore not be described with any greater detail than necessary to explain its cooperation with the other elements of this invention.

In Figure 7 the time responsive mechanism has been shown in a more or less diagrammatic manner and in this view a rack 66 is mounted for reciprocation in a bearing 67. The rack is provided with a collar 68 and is attached thereto by means of a set screw or other means. A helical spring 69 is held in compression between the bearing 67 and the collar 68 and tends to move the rack towards the right. When the rack is moved towards the left as in Figure 7, it turns a gear wheel 70, which is mounted on a shaft 71. A ratchet mechanism 72 permits the gear wheel to turn freely in a counterclockwise direction, but when the pressure on the pawl is released, the spring 69 moves it towards the right, thereby causing the gear 70 to rotate and this in turn rotates an escapement wheel 73 whose rate of rotation is restricted by the escapement mechanism 74. It will be apparent that the time it takes the rack to return to its original position will depend upon the distance it was moved inwardly, since the rate of return is controlled by the escapement above described.

A lever 75 is pivoted at 76 and has one end curved upwardly as designated by reference numeral 77. A roller 78 is attached to the rack and when this roller is in position to engage the under surface of lever 75, it will hold it in the position shown in Figure 7, but when the rack is moved towards the left, it releases the lever 15 and permits the latter to turn freely about its pivot. The free end of lever 75 is connected with the end of spring 59 by means of a connecting rod 79 and the parts are so arranged that when the roller 78 is in the position shown the spring 59 will be flexed into the position shown in the righthand detent in Figure 6, thereupon releasing the grid assembly and permitting the spring 52 to move it towards the right so as to bring the grid out of the muffle. The rack 66 has an extension 80 which extends through the frame member 10, as shown in Figure 4, and the outer end of this extension is threaded for the reception of an elongated nut 81. This nut is so positioned that it will be engaged by the head 51 on the handle 48 when the grid assembly is moved inwardly and this serves to move the rack towards the left and to bring the time responsive mechanism into operative position. The inner end of nut 81 serves as a stop and by adjusting this nut on the threaded end 80, the time it takes the clock mechanism to return to inoperative position can be adjusted.

Operation

The apparatus above described is employed in the following manner. The muffle is first brought to the desired temperature by means of an electric current flowing through the heating element. During this preliminary heating the grid, which is shown partly within and partly without the muffle, in Figure 4, is withdrawn until the plate 40 engages the shoulder 39. Plate 40 serves to limit the amount of heat that escapes and after the muffle has attained the desired temperature, the meat to be cooked is positioned on the rods 46 after which the operator grasps handle 48 and moves the grid assembly inwardly until the lug or pawl 61 engages the opening 64 whereupon the grid assembly is latched and held in opposition to the spring 52. During this inward movement the head 51 of the handle 48 engages the nut 81 and moves the rack towards the left, thereby setting the time responsive mechanism which has previously been adjusted to the necessary time setting. When the operator releases the handle 48, the spring 69 begins to function and after the elapse of the predetermined time, the roller 78 engages the inclined surface 77 and turns the lever 75 about its pivot, thereby withdrawing the lug 61 and releasing the grid assembly, which thereupon moves in response to the action of spring 52 and withdraws the grid from the muffle. The meat can now be removed and replaced by other meat to be cooked.

The grid can be made of any desired size and is usually constructed of such a size that four separate steaks can be cooked at once, but the size of the grid can obviously be modified without modifying the construction of the machine, which is therefore independent of the actual size of the grid or of any other parts thereof.

If the muffle is to be removed for repairs or for any other purpose, plate 31 is first removed, after which the heat insulating block 30, together with muffle can be removed through the opening in plate 21. After the required repairs or replacements have been made, the muffle and insulating block can be inserted and retained in operative position by the plate 31.

Particular attention is directed to the construction of the grid which prevents severe strains to be set up by the rods 46 during temperature changes to which the grid is subjected.

Attention is further directed to the means for closing the entrance to the muffle whenever the grid is in either one of its extreme positions. In the present embodiment this closing means are formed by plates 40 and 44 but it is evident that other equivalent means can be devised which, however, must be responsive to movement of the grid assembly in such a way as to close the exit from the muffle whenever the grid reaches either one of its extreme positions.

Having described the invention what is claimed as new is:

1. In a cooking apparatus having an electrically heated muffle, a base having spaced guides, a grid positioned to be moved into and out of the muffle, the grid comprising bars slidably connected with the guides, the ends of the bars that enter the muffles having attached thereto spaced rods, spring means connected with one bar and its cooperating guide, the spring being tensioned to move the grid out of the muffle, detent means carried by the guide for latching the grid in position within the muffle, stop means operatively associated with the grid for limiting its outward movement, and a time responsive element operatively connected with the detent for releasing the same after a predetermined time.

2. A cooking apparatus comprising a housing, a hollow muffle of refractory material positioned therein, heat insulating material spacing the muffle from the interior of the housing, two spaced parallel guides attached to the housing, a grid slidably connected with the guides for movement into and out of the muffle, spring means associated with the grid for moving it out of the muffle, a stop associated with the grid and the housing for limiting its outward movement, detent means associated with the grid for holding it in operative position in the muffle and a time responsive mechanism operatively connected with the detent for moving it to inoperative position after the lapse of a predetermined time.

3. An electric oven comprising, in combination, a muffle of refractory material, an electric heater element surrounding the same, a layer of heat insulating material enclosing the muffle and heating element, a housing enclosing the muffle assembly, spaced guides secured to the housing in parallel relation with the axis of the muffle and with each other, two substantially U-shaped rods each having one side slidably connected with a guide and the other side extending into the muffle, the sides in the muffle being connected by spaced rods forming a grid, means comprising a spring operatively connected with the grid assembly for urging it in a direction to withdraw the grid from the muffle, a detent mechanism carried by the housing for holding the grid element within the muffle in opposition to the action of the spring and a time responsive mechanism for releasing the detent to permit the spring to function and withdraw the grid from the muffle.

4. A cooking apparatus comprising a frame, a housing positioned thereon, a heat insulated electrically heated muffle in the housing, one end of the muffle opening through one side of the housing, two spaced guides carried by the frame in parallel relation to the muffle, a bar slidably connected with each guide, a grid carried by the bars in position to move into and out of the muffle when the bars reciprocate in the guides, means operatively connected with the grid assembly for exerting a force thereon tending to move the grid outwardly in the muffle, a detent mechanism carried by one guide for engaging the corresponding bar for holding the grid in position in the muffle, a time responsive device carried by the frame and operatively connected with the detent for releasing the latter after the elapse of a predetermined time whereby the bar and the grid can move in response to the biasing force, a stop for limiting the extent of the outward movement, a refractory closure member carried by the inner end of the grid, said member being of a size and shape to substantially fill the opening in the muffle whereby it will close the outer end of the muffle when the grid is withdrawn, means comprising a plate of refractory material carried by the grid assembly for closing the entrance to the muffle when the grid is in position therein, and means responsive to the movement of the grid for moving said plate into and out of muffle closing position.

5. A cooking apparatus comprising a frame, a housing positioned thereon, a refractory muffle in the housing, an electric heating element surrounding the muffle, heat insulating material separating the muffle from the housing, two spaced parallel guides secured to the base, U-shaped bars having one side slidably mounted in each guide, the other ends of the bars extending into the muffle, rods connecting the last named ends to form a grid, the inner ends of the bars forming the grid having attached thereto a plate of refractory material of a size and shape to fit the inside of the muffle, said plate forming a closure for the outer end of the muffle when the grid is in its outermost position, a refractory closure plate slidably attached to the grid bars in position to close the muffle when the grid is in its innermost position, resilient means for urging the closure plate towards the muffle, means comprising a spring operatively connected with one of the U-shaped bars for urging the grid to move out of the muffle, a detent mechanism attached to one guide for engaging the corresponding rod and holding it stationary in opposition to the action of the spring, time responsive means carried by the frame and operatively connected with the detent for releasing the latter, and means for moving the time responsive means to operative position when the grid is moved into the muffle.

6. A mechanism for use with an automatic high temperature meat cooker, comprising a frame, two tubular guides secured to the frame, in spaced parallel relation, a grid assembly comprising two U-shaped bars, means for interconnecting the bars to hold them in spaced parallel relation, one side of each bar being slidably mounted in a guide, the other opposed sides of the bars having a plurality of spaced rods attached thereto to form a grid, a spring associated with one of the guides and one bar for exerting thereon a force tending to move it in one direction, stop means on the guide for limiting the movement of the bar in response to the action of the spring, a detent mechanism carried by the guide for holding the bar in opposition to the spring, a time responsive mechanism carried by the frame, said mechanism comprising a rack having one end extending through an opening in the frame, spring means for urging the rack outwardly, and means carried by the grid assembly for engaging the outer end of the rack for moving it inwardly when the grid assembly is moved inwardly to latching position, said means having a lost motion connection with the grid assembly.

7. A mechanism for use with an automatic high temperature meat cooker, comprising a frame, two tubular guides secured to the frame in spaced parallel relation, a grid assembly comprising two U-shaped bars, means for interconnecting the bars to hold them in spaced parallel relation, one side of each bar being slidably mounted in a guide, the other opposed sides of the bars having a plurality of spaced rods attached thereto to form a grid, a spring associated with one of the guides and one bar for exerting thereon a force tending to move it in one direction, stop means on the guide for limiting the movement of the bar in response to the action of the spring, a detent mechanism carried by the guide for holding the bar in opposition to the spring, a time responsive mechanism carried by the frame, said mechanism comprising a rack having one end extending through an opening in the frame, spring means for urging the rack outwardly, means carried by the grid assembly for engaging the outer end of the rack for moving it inwardly when the grid assembly is moved inwardly to latching position, said means having a lost motion connection with the grid assembly, and means for adjusting the extent of the reciprocation of the rack to vary the time.

HAROLD F. CRAMER.